United States Patent Office 2,830,996
Patented Apr. 15, 1958

2,830,996

RESOLUTION OF DL-PYRROLIDONE-CARBOXYLIC ACID

Bruno Vassel, Deerfield, Ill., assignor to International Minerals & Chemical Corporation, a corporation of New York No Drawing. Application July 28, 1955
Serial No. 525,056

9 Claims. (Cl. 260—326.3)

This invention relates to the resolution of amino acids and, more particularly, to the resolution of DL-pyrrolidonecarboxylic acid.

Synthetic pyrrolidone carboxylic acid is optically inactive and has no commercial value in this form. Optically active L-pyrrolidonecarboxylic acid on the other hand may be converted by hydrolysis with acids or bases to L-glutamic acid, which is a valuable product of commerce, particularly when in the form of its sodium salt. A method for resolving DL-pyrrolidonecarboxylic acid into its enantiomorphs and recovering optically active L-pyrrolidonecarboxylic acid would permit the production of commercially valuable L-glutamic acid from synthetic pyrrolidonecarboxylic acid.

It is an object of this invention to provide a process for the resolution of DL-pyrrolidonecarboxylic acid.

Another object of this invention is to provide a new resolving agent for DL-pyrrolidonecarboxylic acid which is readily available at low cost.

A further object of this invention is to provide a new and useful process by which a mixture of D-pyrrolidonecarboxylic acid and L-pyrrolidonecarboxylic acid may be converted to L-pyrrolidonecarboxylic acid.

In accordance with this invention the above objects are attained by reacting DL-pyrrolidonecarboxylic acid with an optically active form of a tyrosine ester in solution in a lower alkanol and fractionally crystallizing the product from the solution. The reaction between the DL-pyrrolidonecarboxylic acid and the tyrosine ester is readily carried out by merely mixing the two in an alkanol. Tertiary amyl alcohol is a preferred alcohol for carrying out the reaction.

According to one embodiment of the invention, equivalent amounts of DL-pyrrolidonecarboxylic acid and L-n-butyl tyrosinate are dissolved in a lower alkanol, preferably tertiary amyl alcohol, the quantity of alcohol amounting to about eleven times the combined weight of the pyrrolidonecarboxylic acid and tyrosine ester. Dissolution of the solids is obtained by warming the mixture, for example to between about 50° C. and about 90° C., but not exceeding the boiling point of the alcohol utilized. Following complete dissolution, the solution is cooled and seeded with a few crystals of D-pyrrolidonecarboxylic acid-L-butyl tyrosinate salt and stirred until crystallization is substantially complete. Conveniently the crystallization is carried out at about 25° C., but higher or lower temperatures may be used if desired. The best yields are obtained by carrying out the crystallization at a temperature between about 20° C. and about 40° C. The crystals of D-pyrrolidonecarboxylic acid-L-butyl tyrosinate salt may be separated from the liquid phase by any convenient means, for example by filtration. Washing the crystals with a small amount of the same alcohol utilized in carrying out the reaction results in a very high purity D-pyrrolidonecarboxylic acid-L-butyl tyrosinate salt. Purities of the order of 99% are easily obtainable.

Utilizing equivalent quantities of DL-pyrrolidonecarboxylic acid and tyrosine ester results in good yields of the diesterioisomeric salt. Yields can be improved by increasing slightly the quantity of tyrosine ester utilized. Preferably, the quantity of tyrosine ester will amount to between about 1.0 and about 1.2 times the moles of DL-pyrrolidonecarboxylic acid. Yields may also be improved by controlling volume of the solvent. Preferably, the volume of solvent will amount to between about 30 and about 35 times the weight of DL-pyrrolidonecarboxylic acid employed. Larger quantities of solvent will increase the purity of the product at the expense of yields and smaller amounts of solvent will reduce the purity of the product. The D-pyrrolidonecarboxylic acid-L-butyl tyrosinate salt may be separated into its components, D-pyrrolidonecarboxylic acid and L-butyl tyrosinate, by dissolving the salt in water and adjusting the resulting solution to a pH of between about 8.0 and about 9.5, preferably a pH about 8.5. L-butyl tyrosinate is insoluble under these conditions and precipitates. The L-butyl tyrosinate crystals may be separated from the liquid phase by filtration. The liquid phase contains D-pyrrolidonecarboxylic acid which may be racemized to DL-pyrrolidonecarboxylic acid by conventional procedures and resolved according to the procedure of this invention.

Following removal of D-pyrrolidonecarboxylic acid-L-butyl tyrosinate salt from the reaction solution, the mother liquor remaining containing essentially L-pyrrolidonecarboxylic acid may be evaporated to crystallize the L-pyrrolidonecarboxylic acid as such or may be hydrolyzed to L-glutamic acid. Hydrolysis may be effected by adding an alkali such as sodium hydroxide, potassium hydroxide, barium hydroxide or an inorganic acid, such as hydrochloric acid or sulfuric acid to the solution and heating at an elevated temperature until conversion to glutamic acid is substantially complete. Following hydrolysis the L-glutamic acid may be crystallized from the solution at its isoelectric point in accordance with conventional procedures.

In carrying out the process of this invention it is preferred to use a lower alkanol as solvent and tertiary amyl alcohol is the preferred lower alkanol as resulting in the highest yields of diesterioisomeric salt in the highest purities. Other lower alcohols, however, may be used, such as for example, methanol, ethanol, propanol, isopropanol, butanol, n-butanol, secondary-butanol, tertiary-butanol, and the like. By the term "lower alkanol" as it is used in the specification and claims is meant an alkanol having less than about 8 carbon atoms.

L-butyl tyrosinate is a preferred resolving agent in carrying out this invention, but other tyrosine esters may also be utilized. For example, any lower alcohol ester of tyrosine, such as methyl, ethyl, propyl, isopropyl, n-butyl, secondary-butyl, tertiary-butyl ester of tyrosine may be utilized. In general, any lower alcohol ester, that is, any ester formed by reacting tyrosine with an alkanol having less than about 8 carbon atoms, may be utilized as a resolving agent in carrying out the invention. Preferably, the optically active L-form of the particular tyrosine ester is utilized. Upon recovery of D-pyrrolidonecarboxylic acid from the D-pyrrolidonecarboxylic acid-L-tyrosine ester salt, the L-tyrosine ester may be utilized again to resolve a fresh quantity of DL-pyrrolidonecarboxylic acid. The D-pyrrolidonecarboxylic acid thus recovered may be racemized by melting to produce DL-pyrrolidonecarboxylic acid and the latter again resolved in accordance with the instant invention. Thus, this invention permits the substantially complete conversion of DL-pyrrolidonecarboxylic acid to L-glutamic acid and affords a means for permitting the production of L-glutamic acid economically and conveniently from synthetic DL-pyrrolidonecarboxylic acid.

The following examples represent specific embodiments of this invention. All parts and percentages are by weight unless otherwise indicated.

*Example I*

One hundred parts of DL-pyrrolidonecarboxylic acid and 184 parts of L-butyl tyrosinate were charged into a reaction vessel with 3140 parts tertiary amyl alcohol. The mixture was warmed to about 70° C. to completely dissolve the solids. After cooling the solution to room temperature, it was seeded with a few crystals of D-pyrrolidonecarboxylic acid-L-butyl tyrosinate salt and stirred at this temperature for about 24 hours. During this time crystals of D-pyrrolidonecarboxylic acid-L-butyl tyrosinate crystallized out of solution. The crystals were separated by filtration and washed with about 25 parts of tertiary amyl alcohol. The washed crystals had a purity of 99% and were obtained in an amount representing a 60% yield of D-pyrrolidonecarboxylic acid L-butyl tyrosinate based upon the quantity of D-pyrrolidonecarboxylic acid in the original solution. The mother liquor containing essentially L-pyrrolidonecarboxylic acid and a small amount of L-butyl tyrosinate was adjusted to pH 8.5 by the addition of a 50% aqueous sodium hydroxide solution. L-butyl tyrosinate precipitated at this pH and was removed from the solution by filtration. The mother liquor comprising a solution of L-pyrrolidonecarboxylic acid was treated with sodium hydroxide to hydrolyze the L-pyrrolidonecarboxylic acid to L-glutamic acid. Following hydrolysis the reaction mixture was adjusted to pH 3.2 by the addition of concentrated hydrochloric acid and L-glutamic acid was recovered from the solution by crystallization at this pH.

*Example II*

The procedure of Example I was carried out with the exception that the mother liquor remaining following separation of L-butyl tyrosinate and comprising a solution of L-pyrrolidonecarboxylic acid was evaporated to recover crystalline L-pyrrolidonecarboxylic acid therefrom. The yield of L-pyrrolidonecarboxylic acid amounted to about 55% of the theoretical based upon the L-pyrrolidonecarboxylic acid in the original solution.

Having now fully described my invention, what I claim is:

1. A process for resolving DL-pyrrolidonecarboxylic acid which comprises reacting DL-pyrrolidonecarboxylic acid with an optically active form of a $C_1$-$C_7$ alkyl ester of tyrosine in solution in a lower alkanol, fractionally crystallizing therefrom a salt of said ester and pyrrolidonecarboxylic acid of the opposite optical configuration from said ester, separating said salt from the solution, decomprising said salt, and recovering said pyrrolidonecarboxylic acid of opposite optical configuration therefrom.

2. The process of claim 1 in which the alkanol is tertiary amyl alcohol.

3. The process of claim 1 in which the tyrosine ester is L-butyl tyrosinate.

4. A process for receiving DL-pyrrolidonecarboxylic acid which comprises reacting DL-pyrrolidonecarboxylic acid with betwen about 1.0 and about 1.2 equivalents of L-butyl tyrosinate in solution in tertiary amyl alcohol, said alcohol being present in an amount between about 30 and about 35 times the weight of DL-pyrrolidonecarboxylic acid, fractionally crystallizing D-pyrrolidonecarboxylic acid-L-butyl tyrosinate from the solution, separating the crystals, decomposing the crystals, and recovering D-pyrrolidonecarboxylic acid therefrom.

5. A process for resolving DL-pyrrolidonecarboxylic acid which comprises reacting DL-pyrrolidonecarboxylic acid with between about 1.0 and about 1.2 equivalents of L-butyl tyrosinate in solution in tertiary amyl alcohol, said alcohol being present in an amount between about 30 and about 35 times the weight of DL-pyrrolidonecarboxylic acid and crystallizing D-pyrrolidonecarboxylic acid-L-butyl tyrosinate from the reaction solution, separating the crystals from the liquid phase, adjusting the pH of the liquid phase to between about 8.0 and about 9.5 to precipitate L-butyl tyrosinate, separating the solids from the liquid phase, evaporating the liquid phase to dryness at a temperature below the melting point of L-pyrrolidonecarboxylic acid, and recovering the L-pyrrolidonecarboxylic acid which comprises reacting DL-pyrrolidonecarboxylic acid product thereby.

6. A process for resolving DL-pyrrolidonecarboxylic acid with between about 1.0 and about 1.2 equivalents of L-butyl tyrosinate in solution in tertiary amyl alcohol, said alcohol being present in an amount between about 30 and about 35 times the weight of DL-pyrrolidonecarboxylic acid and crystallizing D-pyrrolidonecarboxylic acid-L-butyl tyrosinate from the reaction solution, separating the crystals from the liquid phase, adjusting the pH of the liquid phase to between about 8.0 and about 9.5 to precipitate L-butyl tyrosinate, separating the solids from the liquid phase, hydrolyzing the mother liquor to convert L-pyrrolidonecarboxylic acid to L-glutamic acid, and crystallizing the L-glutamic acid from solution at its isoelectric point.

7. A process for resolving DL-pyrrolidonecarboxylic acid which comprises reacting DL-pyrrolidonecarboxylic acid with between about 1.0 and 1.2 equivalents of an optically active form of a $C_1$-$C_7$-alkly ester of tyrosine, said reaction being carried out in a solution in a lower alkanol in an amount of between about 30 and about 35 times the weight of DL-pyrrolidonecarboxylic acid, fractionally crystallizing therefrom a salt of said ester and pyrrolidonecarborylic acid of the opposite optical configuration from said ester, separating said salt from the solution, decomposing said salt, and recovering said pyrrolidonecarboxylic acid of opposite optical configuration therefrom.

8. A process for resolving DL-pyrrolidonecarboxylic acid which comprises reacting DL-pyrrolidonecarboxylic acid with between about 1.0 and about 1.2 equivalents of an optically active form of a $C_1$-$C_7$-alkyl ester of tyrosine, said reaction being carried out in a solution in a lower alkanol in an amount of between about 30 and about 35 times the weight of DL-pyrrolidonecarboxylic acid, and crystallizing D-pyrrolidonecarboxylic acid-L-butyl tyrosinate from the reaction solution, separating the crystals from the liquid phase, adjusting the pH of the liquid phase to between about 8.0 and about 9.5 to precipitate L-butyl tyrosinate, separating the solids from the liquid phase, evaporating the liquid phase to dryness at a temperature below the melting point of L-pyrrolidonecarboxylic acid, and recovering the L-pyrrolidonecarboxylic acid product thereby.

9. A process for resolving DL-pyrrolidonecarboxylic acid which comprises reacting DL-pyrrolidonecarboxylic acid with between about 1.0 and about 1.2 equivalents of an optically active form of a $C_1$-$C_7$ alkyl ester of tyrosine, said reaction being carried out in a solution in a lower alkanol in an amount of between about 30 and about 35 times the weight of DL-pyrrolidonecarboxylic acid, and crystallizing D-pyrrolidonecarboxylic acid-L-butyl tyrosinate from the reaction solution, separating the crystals from the liquid phase, adjusting the pH of the liquid phase to between about 8.0 and about 9.5 to precipitate L-butyl tyrosinate, separating the solids from the liquid phase, hydrolyzing the mother liquor to convert L-pyrrolidonecarboxylic acid to L-glutamic acid, and crystallizing the L-glutamic acid from solution at its isoelectric point.

References Cited in the file of this patent

UNITED STATES PATENTS

| | | |
|---|---|---|
| 2,528,267 | Dearborn et al. | Oct. 31, 1950 |
| 2,742,500 | Gregory et al. | Apr. 17, 1956 |
| 2,790,000 | Norman et al. | Apr. 23, 1957 |
| 2,794,025 | Amiard et al. | May 28, 1957 |

OTHER REFERENCES

"Organic Chemistry," Karrer, 2nd. Eng. ed., pages 98–99 and 286 (1946). Elsevier Pub. Co., New York, 260/dl digest.